United States Patent
Hallstrom et al.

(10) Patent No.: US 6,513,648 B1
(45) Date of Patent: Feb. 4, 2003

(54) RECIPROCATING CONVEYOR WITH TOP FRONT DRIVE

(76) Inventors: Olof A. Hallstrom, 1920 Hallstrom Rd., Tillamook, OR (US) 97201; Steven A. Hallstrom, 1380 Hallstrom Rd., Tillamook, OR (US) 97141; Daniel C. Hallstrom, 1910 Hallstrom Rd., Tillamook, OR (US) 97141

( * ) Notice: Subject to any disclaimer, the term of this patent is extended or adjusted under 35 U.S.C. 154(b) by 131 days.

(21) Appl. No.: 09/707,540

(22) Filed: Nov. 6, 2000

(51) Int. Cl.⁷ .............................................. B65G 25/04
(52) U.S. Cl. ................ 198/750.4; 198/750.2; 198/750.3; 198/750.5; 414/525.1
(58) Field of Search .......................... 198/750.2, 750.3, 198/750.4, 750.5, 750.7, 750.1; 414/525.1

(56) References Cited

U.S. PATENT DOCUMENTS

| | | | | |
|---|---|---|---|---|
| 3,534,875 A | * | 10/1970 | Hallstrom, Jr. | 198/750 |
| 4,143,760 A | * | 3/1979 | Hallstrom | 198/750 |
| 4,144,963 A | * | 3/1979 | Hallstrom | 198/750 |
| 4,492,303 A | * | 1/1985 | Foster | 198/750 |
| 4,691,819 A | * | 9/1987 | Hallstrom, Jr. | 198/750 |
| 4,727,978 A | * | 3/1988 | Hallstrom, Jr. | 198/737 |
| 4,749,075 A | * | 6/1988 | Foster | 198/750 |
| RE33,196 E | * | 4/1990 | Foster | 196/750 |
| 5,088,595 A | * | 2/1992 | Hallstrom, Jr. | 198/750 |
| 5,125,502 A | * | 6/1992 | Foster | 198/750 |
| 5,165,525 A | * | 11/1992 | Quaeck | 198/750 |
| 5,263,573 A | * | 11/1993 | Hallstrom, Jr. | 198/750 |
| 5,267,641 A | * | 12/1993 | Hallstrom, Jr. | 198/750 |
| 5,323,894 A | * | 6/1994 | Quaeck | 198/750 |
| 5,522,494 A | * | 6/1996 | Lutz | 198/750.3 |
| 5,560,472 A | * | 10/1996 | Gist | 198/750.3 |

* cited by examiner

*Primary Examiner*—Khoi H. Tran
(74) *Attorney, Agent, or Firm*—Olson & Olson

(57) ABSTRACT

The container of a mobile cargo trailer is provided with a reciprocating slat type conveyor floor in which the elongated slats are supported at their lateral edges on V-shaped bearings which are mounted on Y-shaped supports integral with sub-deck sections on the container bottom and joined together with watertight seals. Three cross beams are connected to different groups of the slats and are coupled to hydraulic cylinders located outwardly of the front end of the container and in horizontal alignment with the slats. The cylinders are coupled to a hydraulic fluid pressure source through an arrangement of control valves to effect movement of the group of slats simultaneously in a load moving direction and sequentially in the opposite, slat-retracting direction, with interengaging abutments on the cross drives arranged for moving one of the cross drives and its slats by hydraulic power applied only to the other two cross drive cylinders.

7 Claims, 8 Drawing Sheets

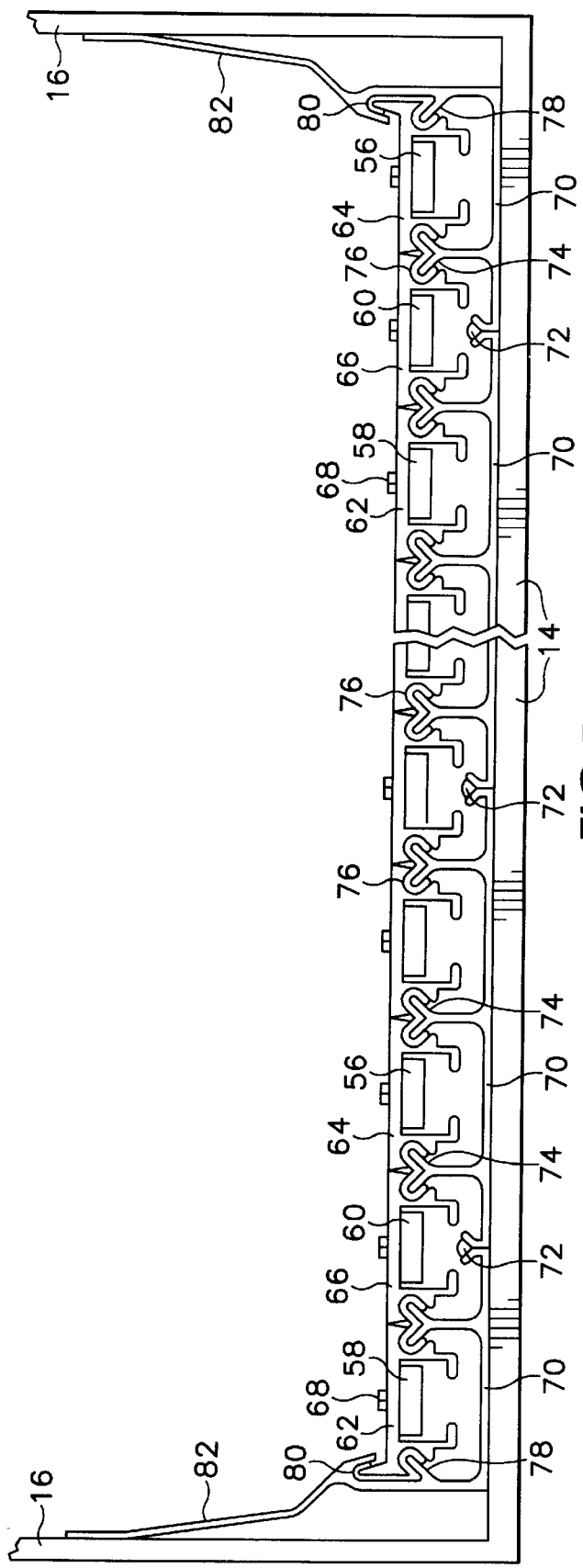
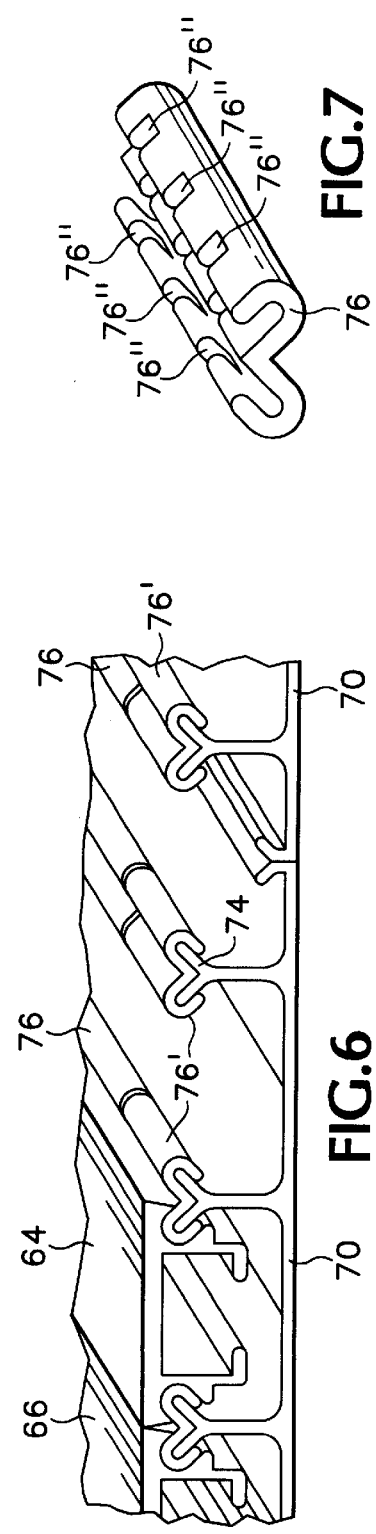

RECIPROCATING CONVEYOR WITH TOP FRONT DRIVE

This invention relates to reciprocating slat type conveyors, and more particularly to such a conveyor forming a floor of a container of a mobile cargo trailer.

Live floor conveyors using reciprocating slats, such as those described in U.S. Pat. Nos. 3,354,875; 4,144,963 4,727,978; and 5,263,573 have been found to allow feeds and fertilizers to filter through the conveyors and onto the ground while the system is in the operating mode. The filtering of chicken feed, for example, to the ground attracts wild birds which in turn contract disease to flocks of young chickens and other fowl. To prevent this, several attempts have been made heretofore to support the edges of the moving slat members on a horizontal bearing member. These also have been found to allow particulate material to filter past the bearing surfaces to the ground.

Placing a false floor below the moving slat members prevented such feeds from falling to the ground. However, it was found that feeds would accumulate on the false floor to the extent of causing lifting of the moving slats above the bearings and thereby allowing even greater amounts of feeds to accumulate between the false floor and the moving slats, thereby creating an attractive site for maggots and the like. In some cases the moving slat members would be lifted to the extent of preventing the reciprocating floor from functioning as a conveyor.

Connecting the moving slat members to a drive mechanism located below the false floor required large holes to be cut into the floor. The filtering of feeds to the ground is facilitated in this area of the drive mechanism. To overcome this problem, drive systems have been placed at the front of the trailer above the floor and within the cargo area. This arrangement displaced valuable space which would otherwise carry cargo. To minimize the loss of cargo space, the hydraulic portion of the drive has been mounted in front of the trailer, with the cross drive portion of the reciprocating slat system located within the cargo area above the moving slats. This arrangement still took away considerable cargo space.

SUMMARY OF THE INVENTION

The reciprocating conveyor of this invention forms the floor of a mobile cargo trailer container and the transverse drive beams of the conveyor slats are located in a space of minimum horizontal and vertical dimension at the front end of the container, and the hydraulic drive mechanism for the drive beams is located outside the front end of the container and in direct alignment with the load supporting slats. The slats are configured to effect loading, transport and unloading of particulate and other fluid type farm produce without loss to the ground.

The principal objective of this invention is to provide a reciprocating slat type conveyor floor for a mobile cargo trailer container for loading, transport and unloading of particulate materials without loss of such materials to the ground during operation of the conveyor.

Another objective of this invention is to provide a reciprocating slat type conveyor of the class described that reduces the amount of space required for the drive mechanism and maximizing the space within the container for cargo.

Still another objective of this invention is the provision of a reciprocating conveyor of the class described in which the hydraulic power drive cylinders are located outside the front end of the cargo container, whereby to increase further the space within the container for cargo.

A further objective of this invention is the provision of a reciprocating conveyor of the class described in which the hydraulic drive cylinders are properly aligned horizontally with the moving slats, whereby to eliminate abnormal wear on the cylinders and minimizing the power requirements for moving the slats.

A still further objective of this invention is to provide the shaped bearings to support the side edges of the reciprocating slat members, whereby to minimize the filtering of particulate material below the slats, and to provide a completely sealed false floor below the moving slat members to completely prevent filtering of particulates to the ground.

Another objective of this invention is to provide a reciprocating conveyor of the class described which utilizes hydraulic circuitry which more efficiently utilizes the available power from the hydraulic power source.

The foregoing and other objects and advantages of this invention will appear from the following detailed description, taken in connection with the accompanying drawings of a preferred embodiment.

BRIEF DESCRIPTION OF THE DRAWINGS

FIG. 5 is a fragmentary elevational view from the rear end of the container of FIG. 1 showing the conveyor assembly integrated with the container.

FIG. 6 is a fragmentary perspective view showing a manner of retaining the bearing members on the bearing supports.

FIG. 7 is a fragmentary perspective view of the underside of a bearing retainer.

DESCRIPTION OF THE PREFERRED EMBODIMENT

Figure 1:
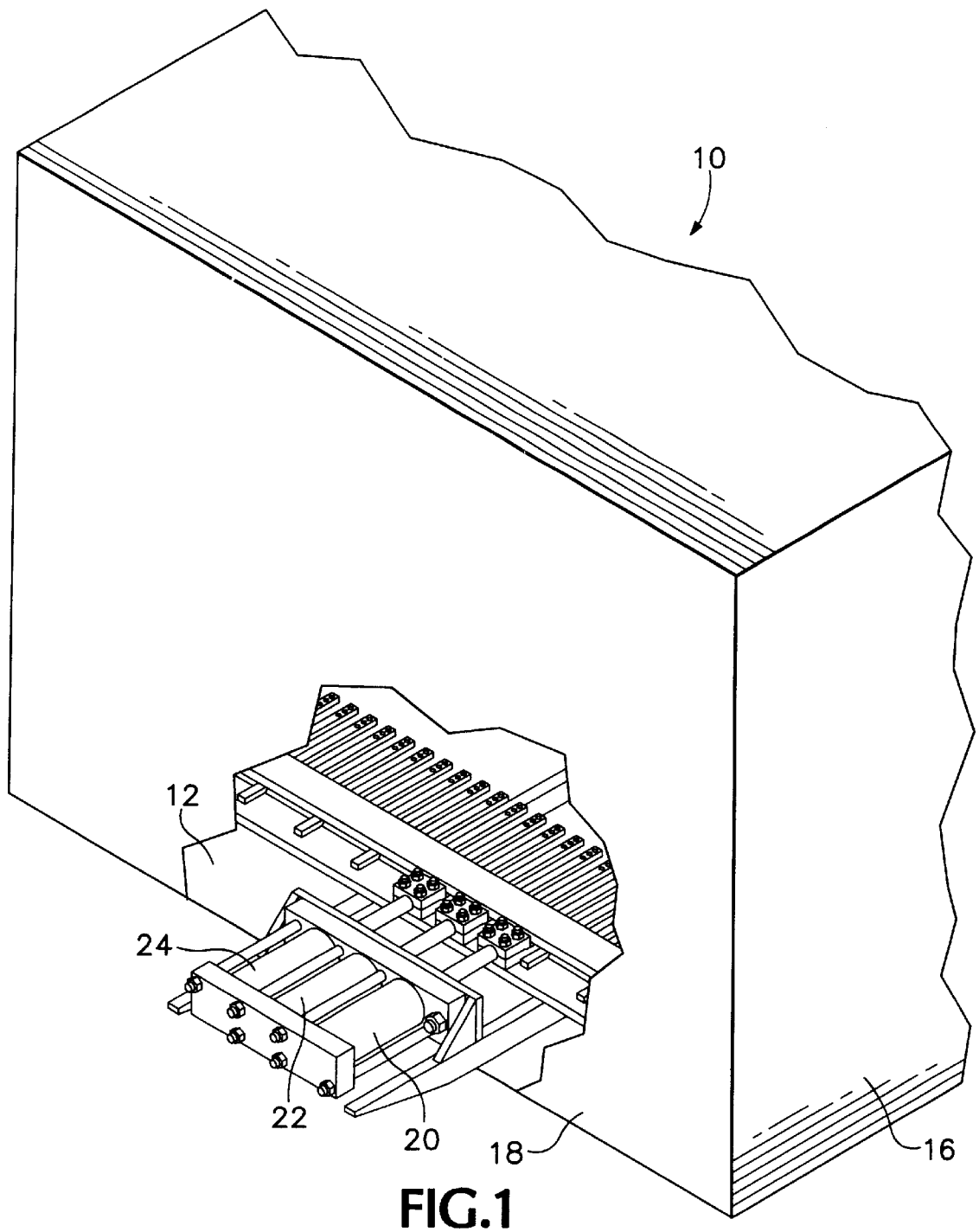
FIG. 1 is a fragmentary perspective view of the front end of a cargo trailer container, the front wall of the container being broken away to disclose the drive mechanism of this invention.

Referring primarily to FIG. 1 of the drawings, the cargo container 10 includes a bottom 12, a front well 14 and opposite side walls 16. A front wall 18 joins the bottom and side walls.

Figure 3:
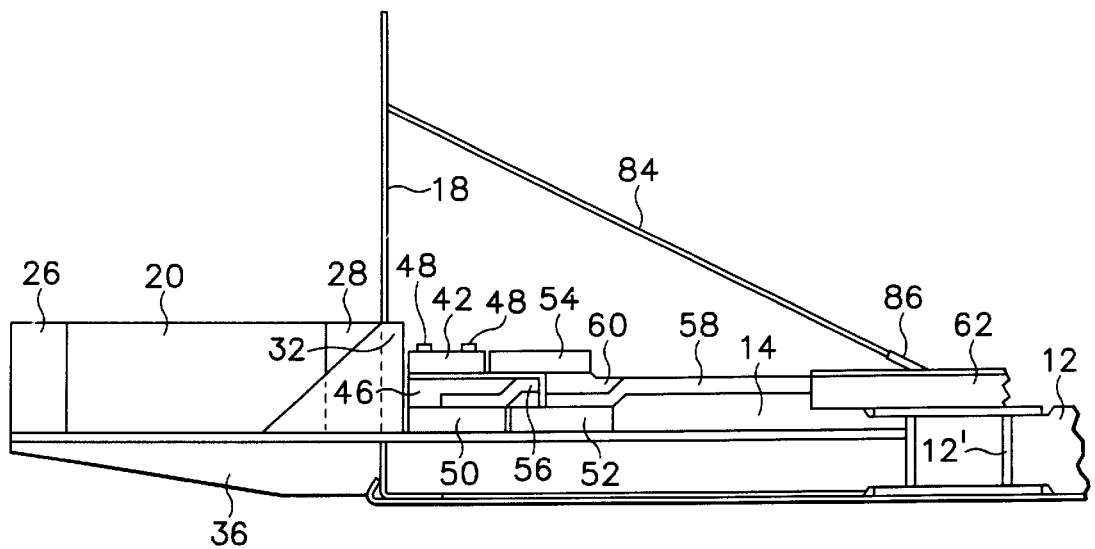
FIG. 3 is a fragmentary side elevation showing the drive mechanism of FIG. 1 coupled to an elongated cargo supporting reciprocating deck slat.

Three hydraulic cylinders 20, 22 and 24 are mounted between transverse front beam 26 and rear beam 28 which are clamped together by the elongated bolts 30. The rear beam 28 is secured to rear support plate 32 by bolts 34, and the rear support plate 32 is secured to the laterally spaced longitudinally extending support beams 36. As best shown in FIG. 3, the beams 36 extend rearwardly from the front beam 26, through an opening in the front wall 18 and into abutment with the transverse box beam 12' forming the front end of the container floor 12.

Figure 2:
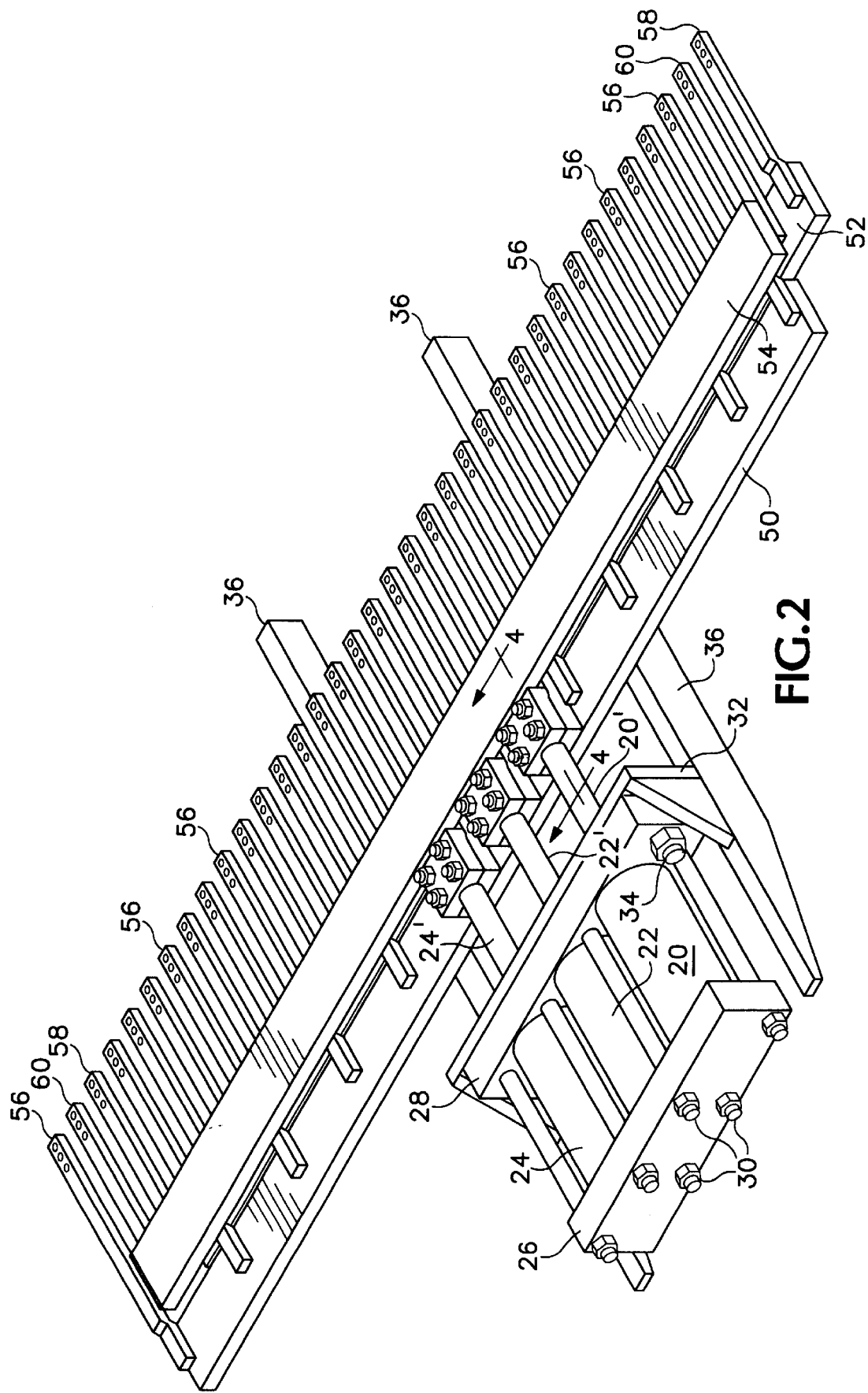
FIG. 2 is a perspective view, on an enlarged scale, of the drive mechanism shown in FIG. 1.
Figure 4:
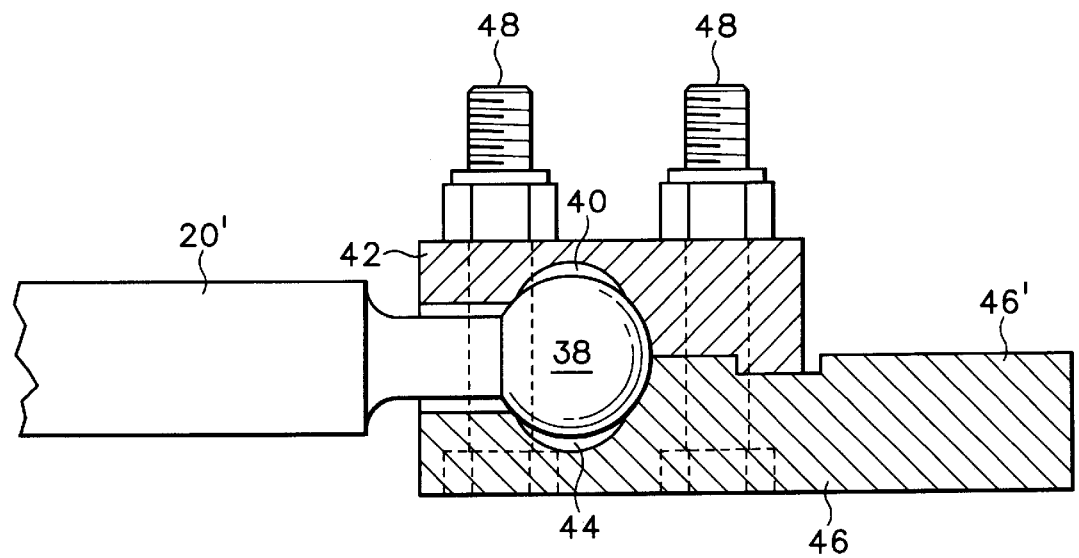
FIG. 4 is a fragmentary section, on an enlarged scale, of a ball and socket coupling between a transverse drive beam and its drive cylinder, taken on the line 4—4 in FIG. 2.

Extending rearwardly from the hydraulic cylinders 20, 22 and 24 are associated piston rods 20', 22' and 24', respectively, for attachment at their rearward ends to associated transversely elongated drive beams. Referring to FIG. 4 of the drawings, there is illustrated a connection of piston rod 20' to a cross drive connector. For this purpose the rearward end of the piston rod 20' is formed with a reduced diameter end portion terminating in an enlarged ball 38. The ball is contained movably in a socket half 40 formed in the connecting block half 42. An associated socket half 44 is formed in the connecting block half 46, and the block halves 42 and 46 are secured together by bolts 48. The block half 46 is provided with a rearward extension 46' which serves to connect one of the three cross drives 50, 52 and 54 associated with the cylinders 20, 22 and 24, respectively. Similar connections are provided for the other two cross drives It is to be noted from FIGS. 2 and 3 that the cross drives 50 and 52 are disposed on a common horizontal plane, with cross drive 50 positioned forwardly of cross drive 52. Cross drive 54 is located above cross drives 50 and 52. Elongated fingers 56, 58 and 60 are secured in spaced apart positions on the cross drives 50, 52, and 54, respectively, and they extend rearwardly for connection to the forward ends of elongated deck slats 62, 64 and 66, respectively, by attaching screws 68 (FIG. 5). The fingers are configured to accommodate connection to the slats which are disposed on a common horizontal plane (FIG. 5).

Referring further to FIG. 5 of the drawings, the floor 12 of the container 10 supports a plurality of longitudinally elongated sub deck sections 70 which are positioned laterally across the transverse dimension of the floor and joined together by liquid tight side seals 72 contained in V-shaped troughs formed by the diverging upper ends of vertical side extensions on adjacent sub deck sections 70. Extending upwardly from the sub deck sections at laterally spaced apart positions are a plurality of V-shaped bearing supports 74. Each bearing support mounts an elongated bearing 76 of low friction synthetic resin, such as Delrin. The bearing wraps around the outer ends of the V-shaped bearing supports and follows inwardly along the V-shape of the supports to form an elongated channel.

The bearings are retained against longitudinal displacement relative to the bearing supports 74 by end stop clips 76' (FIG. 6) which frictionally grip the bearing supports. When made of steel or other structural metal, the frictional grip is sufficient to prevent disengagement from the bearing support. When made of synthetic resin, the frictional grip may be augmented by adhesive inserted in a plurality of longitudinally spaced notches 76" (FIG. 7) to interengage the clip and bearing support.

The deck slats are configured at their lateral side edges to capture the longitudinal sides of the bearings 76, the slat being installed by sliding it longitudinally over the elongated bearing 76. The bearing thus serves to mount the deck slats for easy sliding movement, as well as to capture the slats and prevent upward displacement thereof relative to the bearings.

FIG. 5 also shows a small gap between confronting edges of adjacent slats, to allow fluids, small particles and other debris to gravitate downward to the bearings 76, whereupon reciprocative motion of the deck slats effect movement of the debris longitudinally to the end of the floor.

The lateral end sections of the sub deck are provided with outer side bearing supports 78 which receive the outer side bearing 80 for association with the associated end deck slat. An outer side wall extension 82 projects upwardly from the bearing support 78 for abutment against the sides 16 of the container. The assembly of sub deck sections 70 and wall extensions 82 form a substantially liquid tight container bottom.

Referring again to FIG. 3 of the drawings, it is to be noted that the cross drives 50, 52 and 54 and associated fingers 56, 58 and 60, and supporting beams 36, are contained within a shallow well provided between the forward floor box beam 12' and the front wall 18. It is by this means that the drive mechanism is contained within the cargo container but occupies a minimum of longitudinal and vertical space therein. This drive mechanism is confined under a slope plate 84 which is secured to the front and side walls of the container in position to overlie and enclose the drive mechanism. The rearward, downwardly sloping end of the slope plate is fitted with a flexible wiper 86 which slidably engages the upper surfaces of the deck slats, to minimize the entrance of debris into the forward well.

Figure 8:
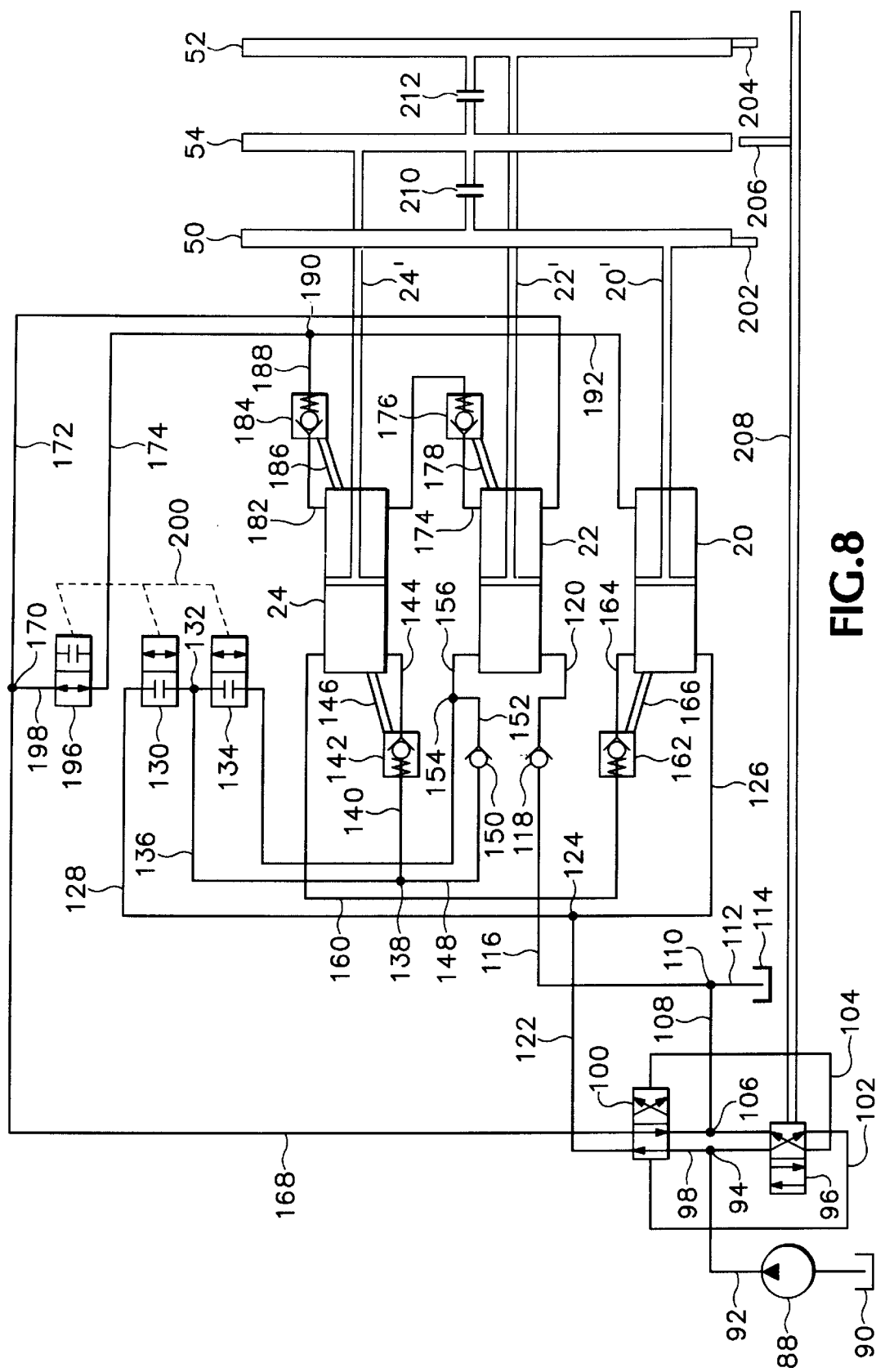
FIG. 8 is a schematic plan view of the hydraulic system and sequencing control for the drive cylinders of the slat drive beams, the system being shown in the condition for moving all three drive beams toward the right, for moving a load toward the rear end of the container.

Referring now primarily to FIG. 8 of the drawings, there is illustrated therein the hydraulic circuitry for reciprocating the deck slats on a predetermined sequence of movements. The circuitry is supplied with hydraulic fluid under pressure by means of hydraulic pump 88 provided with a return fluid storage tank 90 and a fluid pressure outlet. One end of an output conduit 92 is connected to the pump outlet and the opposite end is connected to a T coupling 94. The T coupling communicates at one end with hydraulic valve 96 and at the opposite end with conduit 98 connected to valve 100. Conduit 102 communicates at one end with valve 96 and at the opposite end with the left end of valve 100. In similar manner, conduit 104 communicates at one end with valve 96 and at the opposite end with the right end of valve 100. These conduits 102 and 104 serve to provide hydraulic fluid under pressure to switch the valve 100 to its alternate positions.

T coupling 106 interconnects valves 96 and 100, and conduit 108 communicates the T coupling 106 with T coupling 110. Conduit 112 communicates the T coupling to tank 114. The T coupling 110 also communicates through conduit 116 with valve 118. The opposite end of the valve communicates through conduit 120 with the base of cylinder 22.

Conduit 122 communicates at one end with valve 100 and at the opposite end with T coupling 124. This T coupling communicates through conduit 126 with the base of cylinder 20 and through conduit 128 to valve 130. T coupling 132 interconnects valves 130 and 134 and also through conduit 136 to T coupling 138. Conduit 140 communicates T coupling 138 with valve 142. The opposite end of valve 142 communicates through conduit 144 with the base of cylinder 24. Mechanical actuator link 146 interconnects valve 142 and the base of cylinder 24, for the purpose of actuating the valve 142 when the piston of cylinder 24 reaches the base end thereof.

The T coupling 138 also communicates through conduit 148 with valve 150. The opposite end of valve 150 communicates through conduit 152 with T coupling 154 which communicates through conduit 156 with the base of cylinder 22 and also through conduit 158 to valve 134.

The base of cylinder 24 communicates through conduit 160 with valve 162 which, in turn, communicates through conduit 164 with the base of cylinder 20. Mechanical actuator link 166 interconnects the valve 162 and cylinder 20, for operation of the valve by the piston of cylinder 20.

Conduit 168 communicates valve 100 with T coupling 170 which, in turn, communicates through conduit 172 with the head of cylinder 22. This cylinder head communicates through conduit 174 with valve 176 which is manually operable by the mechanical actuator link 78 interconnecting the valve and the head of cylinder 22, for actuation by the piston therein. Valve 176 also communicates through conduit 180 with the head of cylinder 24 which, in turn, communicates through conduit 182 with valve 184. Mechanical actuator link 186 interconnects the valve 184 and the head of cylinder 24 for operating the valve by the piston of said cylinder.

Valve 182 also communicates through conduit 188 with T coupling 190 which communicates through conduit 192 with the head of cylinder 20 and through conduit 194 with valve 196. This valve communicates through conduit 198 with T coupling 170. Mechanical interconnect 200 joins the valves 130, 134 and 196 for simultaneous actuation.

Trigger 202 is mounted on cross drive 50 and trigger 204 is mounted on cross drive 52 for selective engagement with abutment 206 projecting from the elongated actuator rod 208 which mechanically engages valve 96 to effect selective switching thereof. Mutual abutments 210 are provided on cross drives 50 and 54, and mutual abutments 212 are provided on cross drives 52 and 54, for operation in the manner described hereinafter.

The operation of the system described hereinbefore is as follows:

Referring first to FIG. 8 of the drawings, the configuration illustrated effects movement of all three cylinders and hence all of the deck slats in unison toward the right. Oil under pressure leaves the pump 88 and flows through coupling 94 where it branches down through the pilot valve 96 and around to the left end of valve 100. Oil is exhausted from the right side of valve 100, back through valve 96 and couplings 106 and 110 to tank 114. This holds valve 100 in the position shown.

From coupling 94 oil flows up through valve 100 and coupling 124. The oil cannot flow up conduit 128 from coupling 124 because valve 130 is blocking flow. This forces the oil from coupling 124 into the base of cylinder 20, applying force to its piston. The oil can flow out of the base of cylinder 20 through valve 162 and into the base of cylinder 24, applying force to the associated piston. Oil leaving cylinder 24 is blocked by valves 130 and 134 and by the check valve 150. Accordingly, cylinder 22 does not receive any oil pressure from the pump. Oil is exhausted from cylinder 24 through valve 184 and coupling 190 where it is joined by oil exhausting from cylinder 20. It then travels up through valve 196 into coupling 170, then over and down through valve 100, couplings 106 and 110 to tank 114. This causes cylinders 24 and 20 to extend.

Figure 9:
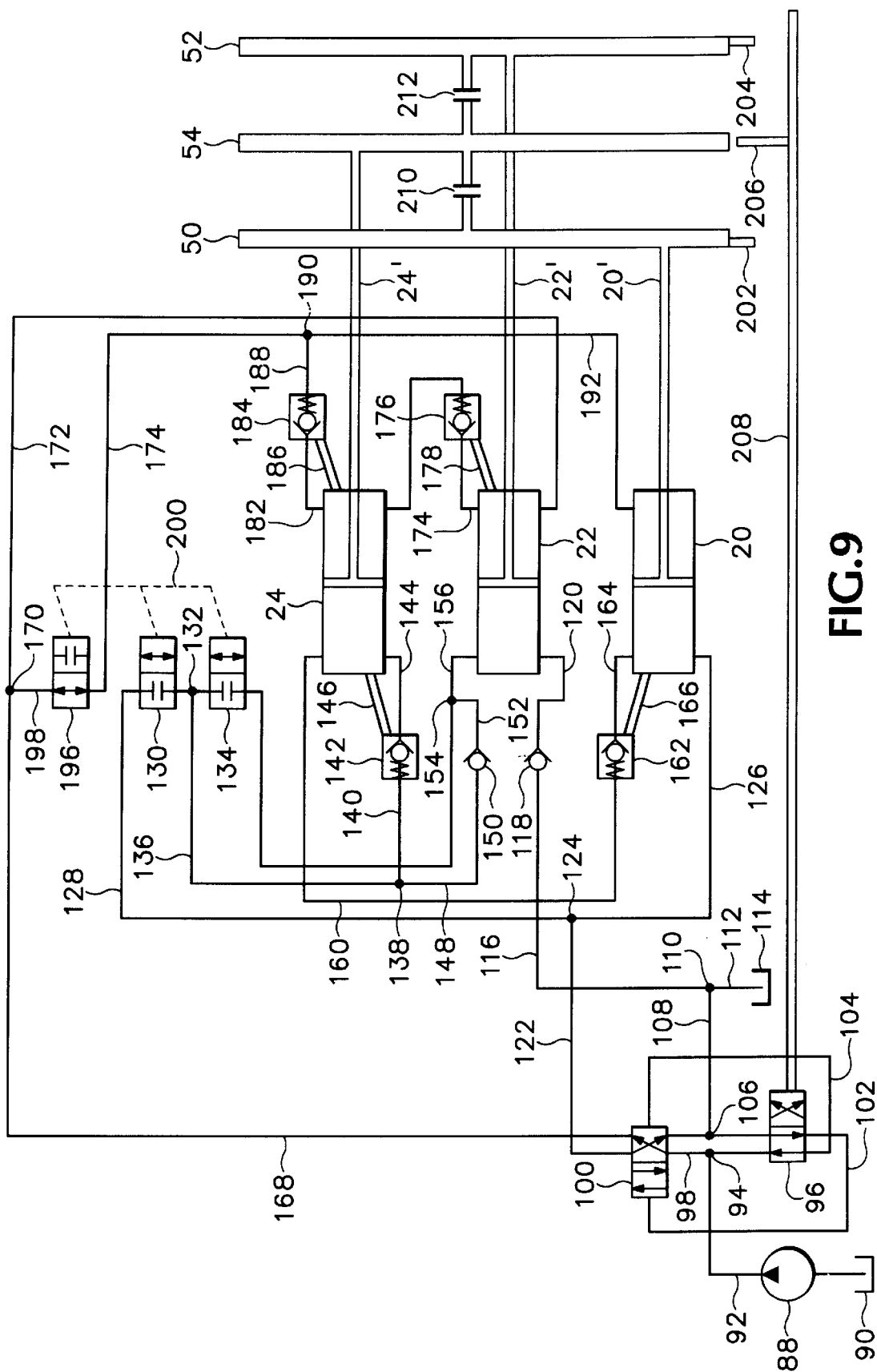
FIG. 9 is a schematic plan view similar to FIG. 8 showing the hydraulic system in the condition for moving the three drive beams sequentially toward the left, or front end of the container.
Figure 10:
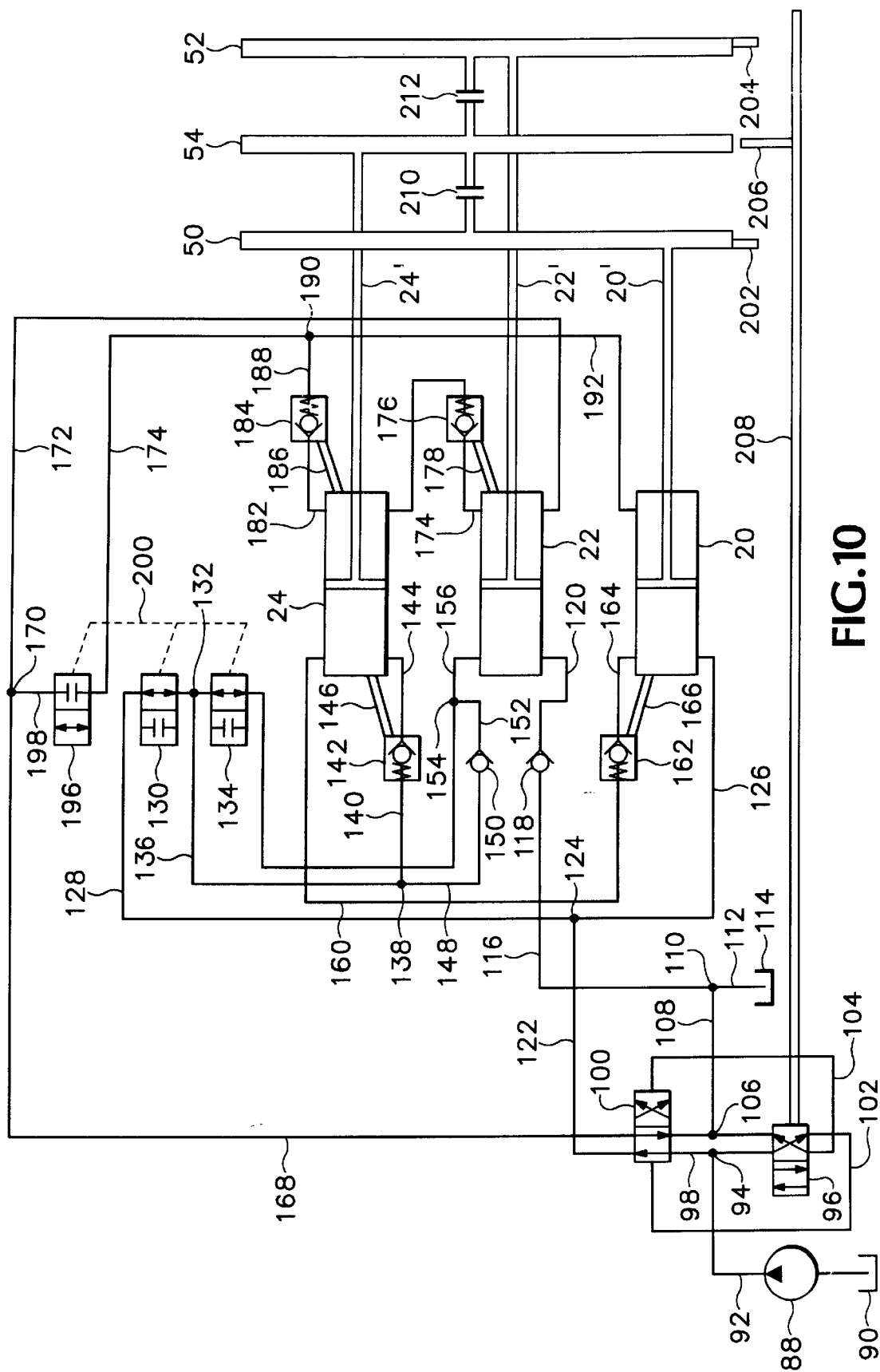
FIG. 10 is a schematic plan view similar to FIG. 8 showing the hydraulic system in the condition for moving the three drive beams sequentially toward the right, or rear end of the container.
Figure 11:
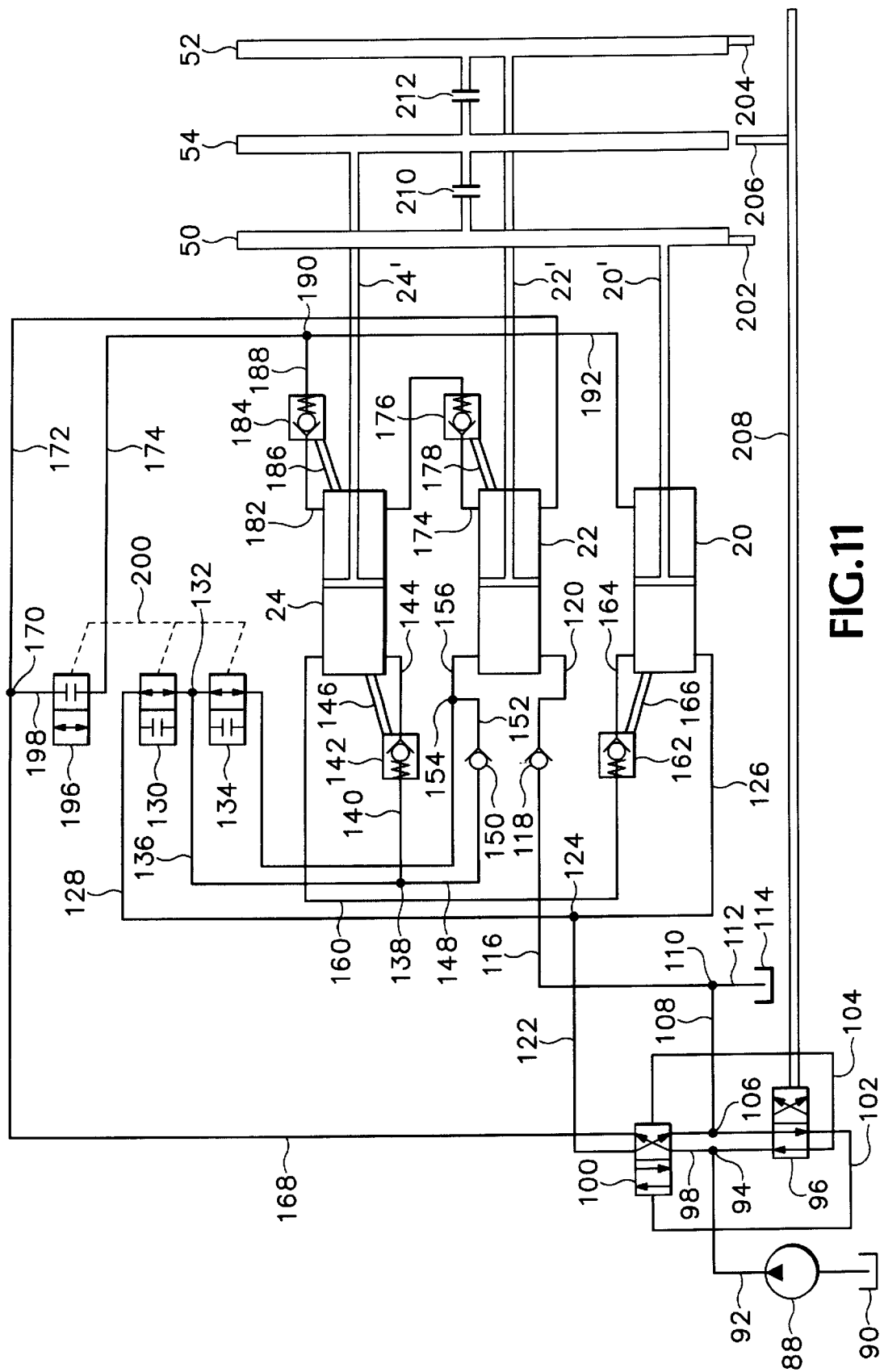
FIG. 11 is a schematic plan view similar to FIG. 8 showing the hydraulic system in the condition for moving all three drive beams toward the left, for moving a load toward the front end of the container.

The forward motion of cylinder rods 24' and 20' through their cross drives 54 and 50 and abutments 210 and 212 pull cylinder rod 22' out with them. This causes the oil in the head of cylinder 22 to exhaust through coupling 170, valve 100, couplings 106 and 110 to tank. As cylinder rod 22' is drawn out, oil is pulled from the tank 114 through connection 110, thence through valve 118 and into the base of cylinder 22. This allows the base of cylinder 22 to fill with oil. The three groups of slats thus have been moved simultaneously toward the right, to effect moving a load on the slats toward the right. When the cylinders reach the end of their travel, trigger 202, which is on cross drive 50, connects with the mechanical linkage 206 and 208, drawing it forward and causing valve 96 to shift to its other position. This causes pilot oil that flows through valve 96 to be applied to the right end of valve 100 and allows pilot oil to be exhausted from the left end of valve 100 through pilot valve 96 to tank 90. This causes valve 100 to shift to its other position shown in FIG. 9.

Oil from the pump 88 now is directed through valve 100 up through coupling 170 and conduit 172 into the head of cylinder 22, then through valve 176 into cylinder 24. Oil then flows through valve 184 and coupling 190 where it is joined by oil that is coming down from coupling 170 through valve 196, from whence it travels into the head of cylinder 20. All three cylinders now have pressure on the head side of their pistons causing them to try to retract. However, the oil in the base of cylinder 24 is blocked by valves 130, 134 and 150, or by valve 162.

Cylinder 22 cannot retract because the oil in its base is blocked by valves 130, 134 and 142, or by valve 118. However, Cylinder 20 can retract because the oil in its base can exhaust through conduit 126 and coupling 124, thence through valve 100, couplings 106 and 110 to tank 114. When cylinder 20 reaches the end of its stroke, it mechanically opens valve 162 through link 166 which allows oil in the base of cylinder 24 to exhaust through valve 162, and then through the base of cylinder 20 and on through coupling 124, valve 100, couplings 106 and 110 to tank.

When cylinder 24 reaches the end of its stroke, link 146 mechanically opens valve 142 which allows the oil from the base of cylinder 22 to travel back past valve 150, coupling 138 through the opened valve 142 into cylinder 24 and on to tank through the same path. When cylinder 22 finally reaches the end of its stroke, trigger 204 which is connected to cross drive 52 contacts the abutment 206 which mechanically pushes valve 96 back to its original position in FIG. 6. All three groups of slats thus have been retracted sequentially toward the left. This starts the cycle all over again, to effect stepwise movement of a load toward the right.

If valves 96, 130 and 134, which are ganged together by mechanical interconnect 200, are mechanically shifted to the position shown in FIG. 8, oil still flows through the pilot 96 as before. Oil from coupling 94 travels up through valve 100, through coupling 124 and fills the base of cylinder 20. Oil then flows back through valve 162 to the base of cylinder 24. Oil flows out of the base of cylinder 24, back through valve 142 and couplings 138 and 132 where it is joined by oil flowing from coupling 124 through valve 130, then through valve 134 and into the base of cylinder 22.

Oil cannot leave the base of cylinder 22 because it is blocked by valve 118. This causes all three cylinders to try to extend. The oil in cylinder 20 is blocked from exhausting because of valves 184 and 196. Cylinder 24 cannot extend because it is blocked by valve 176. However, oil in cylinder 22 can exhaust up through conduit 172 and coupling 170 back through valve 100 to tank 114.

When cylinder 22 reaches the end of its stroke, link 178 mechanically opens valve 176 allowing the oil from cylinder 24 to exhaust. When cylinder 24 reaches the end of its travel, it opens valve 184 and allows the oil from cylinder 20 to exhaust through valve 184. When cylinder 20 reaches the end of its stroke, completing the stepwise retraction of all three groups of slats, trigger 202 and rod 208 mechanically shift valve 96 to its other position which, in turn, causes valve 100 to shift to the position shown in FIG. 9, wherein all three cylinders are traveling back to the front together.

Oil from valve 96 from the pump 88 travels through valve 100 up through coupling 170 into the head of cylinder 22, thence through valve 176 into the head of cylinder 24, through valve 184 and into the head of cylinder 20, to retract all three cylinders simultaneously and move all slats simultaneously and move a load toward the left. Oil in cylinder 24 can exhaust directly back through coupling 124 and valve 100 to tank. Oil in cylinder 24 can exhaust by traveling back through valve 142 and coupling 138, up through coupling 132 and thence through valve 130 back through coupling 124 to tank. Oil that is still in cylinder 22 can exhaust by traveling up through coupling 154, through valves 134, 130 and coupling 124, thence through valve 100 to tank. When cylinder 22 reaches the end of its stroke, trigger 204 and rod 208 mechanically shifts valve 96 back to its original position, which in turn switches valve 100 and returns to the configuration of FIG. 8, where the cycle starts all over again.

It will be apparent to those skilled in the art that various changes may be made in the size, shape, type, number and arrangement of parts described hereinbefore without departing from the spirit of this invention.

We claim:

1. A reciprocating conveyor comprising:
   a) a base,
   b) a plurality of bearing supports spaced apart laterally on said base,
   c) an elongated bearing mounted on each bearing support and forming a debris removal channel on its upper surface,
   d) a plurality of elongated load-supporting slat members supported slidably on said bearings and disposed in side-by-side relationship over said base and each slat member having downwardly extending lateral sides each extending slidably into one of said channels with the confronting lateral side of the adjacent slat member extending slidably into the same channel, and
   e) drive means engaging the slat members for reciprocating them longitudinally, the drive means including:
      1) three laterally extending cross drive members,
      2) connector means detachably securing each cross drive member to a plurality of slat members to form a grip of slat members connected to each cross drive member,
      3) the three cross drive members forming three groups of slat members, two of the cross drive members being positioned one horizontally ahead of the other, the third cross drive member being positioned vertically above the said two cross drive members, and connector fingers connect the three cross drive members to the slat members on a common horizontal plane, and
      4) fluid pressure extensible power drive means engaging each cross drive member for reciprocating said cross drive members and the slats connected thereto.

2. A reciprocating conveyor comprising:
   a) a base,
   b) a plurality of bearing supports spaced apart laterally on said base,
   c) an elongated bearing mounted on each bearing support and forming a debris removal channel on its upper surface, each bearing including laterally extending arcuate side extensions and the lateral sides of each slat member are configured with arcuate longitudinal grooves, with the arcuate longitudinal grooves of adjacent slat members slidably receiving the arcuate slide extensions of the associated bearing for securing the adjacent slat members to the same bearing against vertical displacement of the slat members relative to the bearing,
   d) a plurality of elongated load-supporting slat members supported slidably on said bearings and disposed in side-by-side relationship over said base and each slat member having downwardly extending lateral sides each extending slidably into one of said channels with the confronting lateral side of the adjacent slat member extending slidably into the same channel, and
   e) drive means engaging the slat members for reciprocating them longitudinally.

3. A reciprocating conveyor comprising:
   a) a base including a plurality of elongated sub-base members arranged in side-by-side relationship and the plurality of sub-base members includes vertical side extensions having angular upper end portions which form a V-shaped trough between abutting vertical sides of adjacent sub-base members, and elongated sealing means in said trough interengages and secures together the side extensions and the adjacent sub-base members,
   b) a plurality of bearing supports spaced apart laterally on said base,
   c) an elongated bearing mounted on each bearing support and forming a debris removal channel on its upper surface,
   d) a plurality of elongated load-supporting slat members supported slidably on said bearings and disposed in side-by-side relationship over said base and each slat member having downwardly extending lateral sides each extending slidably into one of said channels with the confronting lateral side of the adjacent slat member extending slidably into the same channel, and
   e) drive means engaging the slat members for reciprocating them longitudinally.

4. In combination with mobile cargo trailer container having front and side walls and a bottom, a reciprocating conveyor comprising:
   a) a plurality of elongated sub-base members mounted on the container bottom in side-by-side relationship,
   b) elongated sealing means interengaging the side edges of adjacent sub-base members for waterproofing said side edges,
   c) a plurality of bearing supports spaced apart laterally on said sub-base members,
   d) an elongated bearing mounted on each bearing support and forming a debris removal channel on its upper surface,
   e) a plurality of elongated cargo-supporting slat members supported slidably on said bearings and disposed in side-by-side relationship over said sub-bases and each slat member having downwardly extending lateral sides extending slidably into one of said channels with the confronting lateral side of the adjacent slat member extending slidably into the same channel,
   f) three laterally extending cross drive members forming three groups of slat members, two of the cross drive members being positioned one horizontally ahead of the other, the third cross drive member being positioned vertically above the said two cross drive members, g) connector fingers connecting the three cross drive members to the slat members on a common horizontal plane, and h) drive means engaging each cross drive member for reciprocating the associated slat members independently of each other group.

5. The combination of claim 4 including abutment members on the cross drive members arranged for abutment of one cross drive member by the other cross drive members for moving said one cross drive member by said other cross drive members in one direction of movement of said other cross drive members.

6. In combination with mobile cargo trailer container having front and side walls and a bottom, a reciprocating conveyor comprising:

a) a plurality of elongated sub-base members mounted on the container bottom in side-by-side relationship, b) elongated sealing means interengaging the side edges of adjacent sub-base members for waterproofing said side edges, c) a plurality of bearing supports spaced apart laterally on said sub-base members, d) an elongated bearing mounted on each bearing support and forming a debris removal channel on its upper surface, each bearing including laterally extending arcuate side extensions and the lateral sides of each slide member being configured with arcuate longitudinal grooves, with the arcuate longitudinal grooves of adjacent slat members slidably receiving the arcuate side extensions of the associated bearing for securing the adjacent slat members to the same bearing against vertical displacement of the slat members relative to the bearing.

7. In combination with a mobile cargo trailer container having front and side walls and a bottom, a reciprocating conveyor comprising:

a) a plurality of elongated sub-base members mounted on the container bottom in side-by-side relationship, the sub-base members including vertical side extensions adjacent the side walls of the container, b) elongated sealing means interengaging the side extensions and the adjacent sub-base members for waterproofing said side edges, c) a plurality of bearing supports spaced apart laterally on said sub-base members, d) an elongated bearing mounted on each bearing support and forming a debris removal channel on its upper surface, e) a plurality of elongated cargo-supporting slat members supported slidably on said bearings and disposed in side-by-side relationship over said sub-bases and each slat member having downwardly extending lateral sides extending slidably into one of said channels with the confronting lateral side of the adjacent slat member extending slidably into the same channel, f) a plurality of laterally extending cross drive members, g) connector means detachably securing each cross drive member to a plurality of the slat members to form a group of slat members connected to each cross drive member, and h) drive means engaging each cross drive member for reciprocating the associated slat members independently of each other group.

* * * * *